United States Patent [19]

Suzuki

[11] Patent Number: 4,836,055
[45] Date of Patent: Jun. 6, 1989

[54] SYSTEM FOR CONTROLLING A LINE PRESSURE IN AN AUTOMATIC TRANSMISSION FOR MOTOR VEHICLES

[75] Inventor: Hosei Suzuki, Musashino, Japan

[73] Assignee: Fuji Jukogyo Kabushiki Kaisha, Tokyo, Japan

[21] Appl. No.: 177,493

[22] Filed: Apr. 4, 1988

[30] Foreign Application Priority Data

Apr. 13, 1987 [JP] Japan .................................. 62-091544

[51] Int. Cl.$^4$ ............................................ B60K 41/18
[52] U.S. Cl. .................................... 74/866; 74/752 A
[58] Field of Search .............. 74/866, 867, 868, 752 A

[56] References Cited

U.S. PATENT DOCUMENTS

| 3,680,410 | 8/1972 | Sumiyoshi et al. | 74/866 |
|---|---|---|---|
| 3,688,609 | 9/1972 | Friedline | 74/866 |
| 3,776,048 | 12/1973 | Enomoto et al. | 74/866 |
| 3,943,799 | 3/1976 | Sakai et al. | 74/866 |
| 4,282,780 | 8/1981 | Totani et al. | 74/866 |
| 4,319,501 | 3/1982 | Sugimoto | 74/866 |
| 4,486,838 | 12/1984 | Itoh et al. | 74/866 X |
| 4,488,456 | 12/1984 | Taga et al. | 74/867 |
| 4,722,247 | 2/1988 | Shindo et al. | 74/867 X |
| 4,763,545 | 8/1988 | Shibayama et al. | 74/868 |

FOREIGN PATENT DOCUMENTS 56-127141 9/1981 Japan .

Primary Examiner—Dirk Wright
Attorney, Agent, or Firm—Martin A. Farber

[57] ABSTRACT

A system for controlling line pressure has a line pressure calculator for producing a line pressure signal in response to load on an engine and vehicle speed, a control signal generator responsive to the line pressure signal for producing a control signal, and an electromagnetic valve operated by the control signal, for controlling pressure of control oil in a hydraulic circuit of an automatic transmission. A pressure regulator valve provided in the hydraulic circuit is operated by the control oil to control line pressure.

7 Claims, 4 Drawing Sheets

FIG. 3
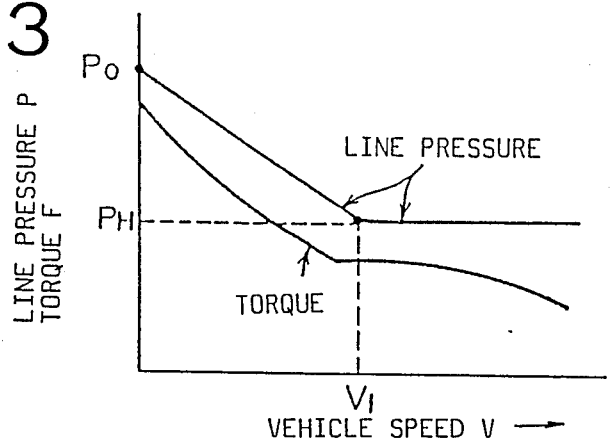
FIG. 4
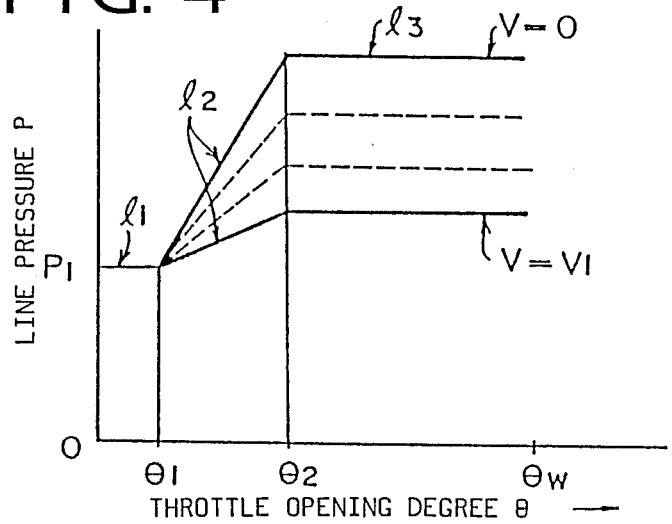
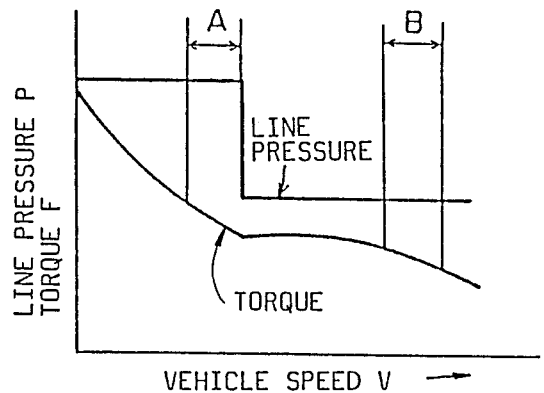
FIG. 5
(PRIOR ART)

SYSTEM FOR CONTROLLING A LINE PRESSURE IN AN AUTOMATIC TRANSMISSION FOR MOTOR VEHICLES

BACKGROUND OF THE INVENTION

The present invention relates to a system for controlling line pressure in an automatic transmission where the pressure is controlled dependent on vehicle speed and throttle opening degree by operating a solenoid operated valve provided in the system.

In a conventional hydraulic circuit for an automatic transmission, the line pressure is controlled by a pressure modifier valve actuated by governor pressure which changes with vehicle speed. As shown in FIG. 5, the line pressure is stepwisely changed from a high level value to a low level value in accordance with the vehicle speed. Namely, in a low vehicle speed range, where engine torque is large, the line pressure is at a high level and in a high vehicle speed range, where the torque becomes smaller, the line pressure is reduced.

Japanese Utility Model Laid Open No. 56-127141 discloses an automatic transmission comprising a hydraulic circuit having three shift valves and an electronic control circuit having a solenoid operated valve to which a signal dependent on vehicle speed and on engine load is applied. The solenoid operated valve is arranged to produce control pressures of three levels. The shift valves are operated by different control pressures respectively, so that the transmission ratio may be changed.

However, in the line pressure control shown in FIG. 5, since the line pressure can only be kept at either of the two levels, there are two regions designated by A and B where line pressures are too high relative to the torque. In such regions, pump loss in an oil pump and shock which occurs at changing of the transmission ratio increase.

SUMMARY OF THE INVENTION

The object of the present invention is to provide a system for controlling line pressure in an automatic transmission device, wherein the proportion of the line pressure to engine torque is kept relatively constant at any vehicle speed so that pump loss and shock which occurs at the changing of the transmission ratio are reduced.

According to the present invention, there is provided a system for controlling line pressure in a hydraulically operated automatic transmission for a motor vehicle comprising an engine load detector for producing a load signal dependent on load on an engine of the vehicle, a vehicle speed detector for producing a vehicle speed signal dependent on speed of the vehicle, a line pressure calculator responsive to the load signal and vehicle speed signal for producing a line pressure signal representing line pressure, and control signal generating means responsive to the line pressure signal for producing a control signal.

A hydraulic circuit of the automatic transmission has an electromagnetic valve operated by the control signal, for controlling pressure of a control oil in a hydraulic circuit of the automatic transmission, and a pressure regulator valve is provided in the hydraulic circuit and operated by the control oil to control line pressure, and the line pressure calculator produces the line pressure signal representing the necessary line pressure which increases with the load signal and decreases with the vehicle speed signal and has a constant value when the load signal and the vehicle speed signal exceed respective predetermined values so as to approximate the line pressure to torque of the engine.

In an aspect of the invention, the engine load detector is a throttle opening degree calculator, the control signal comprises pulses, and the electromagnetic valve is a solenoid operated valve. The system has further a pressure modifier valve operated by the control signal, for generating modifier pressure for operating the pressure regulator valve.

The present invention will be more apparent from the following description made with reference to the accompanying drawings.

BRIEF DESCRIPTION OF DRAWINGS

FIG. 3 is a graph showing characteristics of engine torque and line pressure at wide-open throttle;

FIG. 4 is a graph showing a relationship between line pressure and throttle opening degree; and FIG. 5 is a graph showing characteristics of engine torque and line pressure in a conventional system.

DETAILED DESCRIPTION OF THE PREFERRED EMBODIMENTS

Figure 1A:
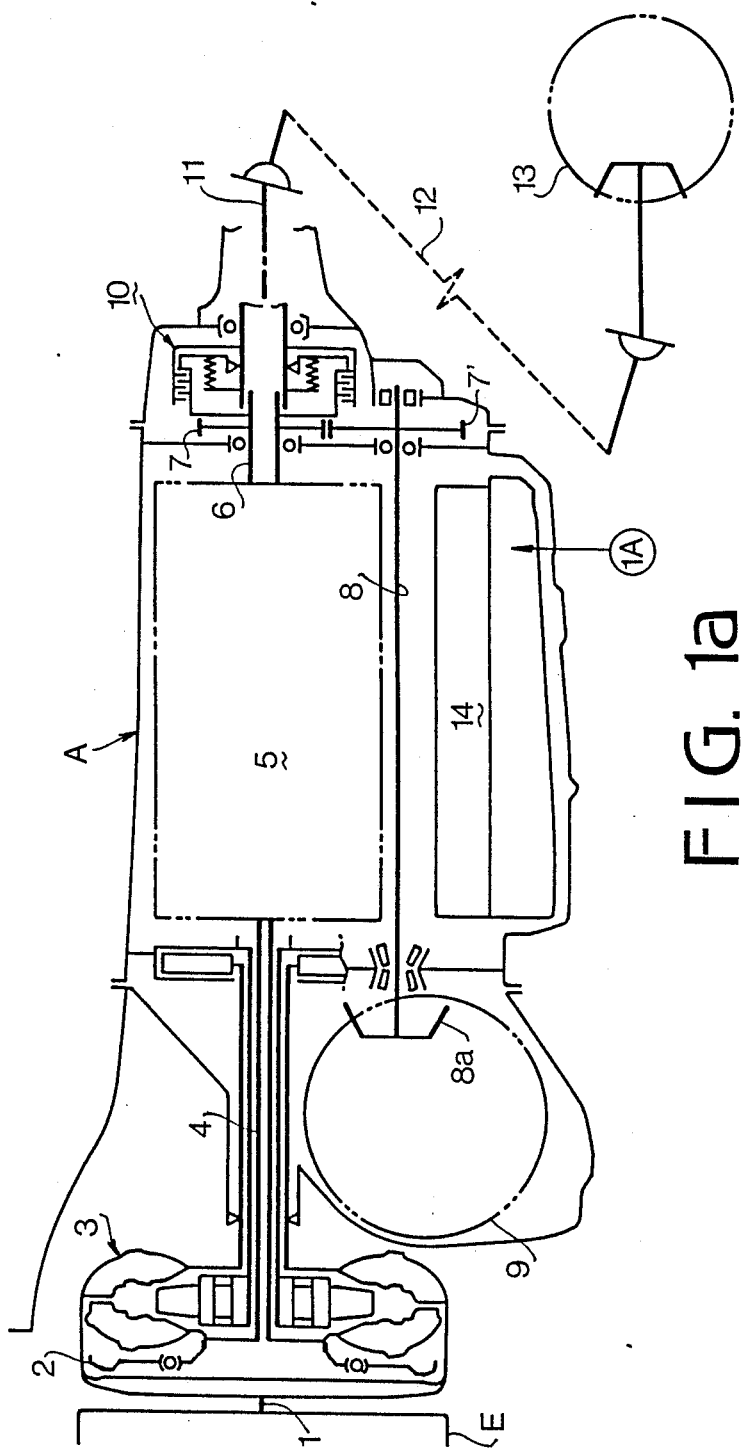
FIGS. 1a and 1b show a four-wheel drive power transmission system and a block diagram of a control unit provided in the system of the present invention.

Referring to FIG. 1, an internal combustion engine E is mounted on a front portion of a vehicle. A crankshaft 1 of the engine E is operatively connected with a torque converter 3 having a lockup clutch 2 of an automatic transmission A. The automatic transmission A comprises the torque converter 3, and an automatic transmission device 5 operatively connected with the torque converter 3 through an input shaft 4.

The output of the automatic transmission device 5 is transmitted to an output shaft 6 on which a drive gear 7 is securely mounted, and the drive gear 7 engages with a driven gear 7'. The driven gear 7' is securely mounted on a front drive shaft 8, which is integral with an drive pinion 8a engaged with a crown gear 9 of a final reduction device for the front wheels of the vehicle. The output shaft 6 is connected to a rear drive shaft 11 through a transfer clutch 10 which is in a form of a fluid operated multiple-disc friction clutch. The rear drive shaft 11 is further operatively connected to a final reduction device 13 for rear wheels of the vehicle through a propeller shaft 12.

Figure 1B:
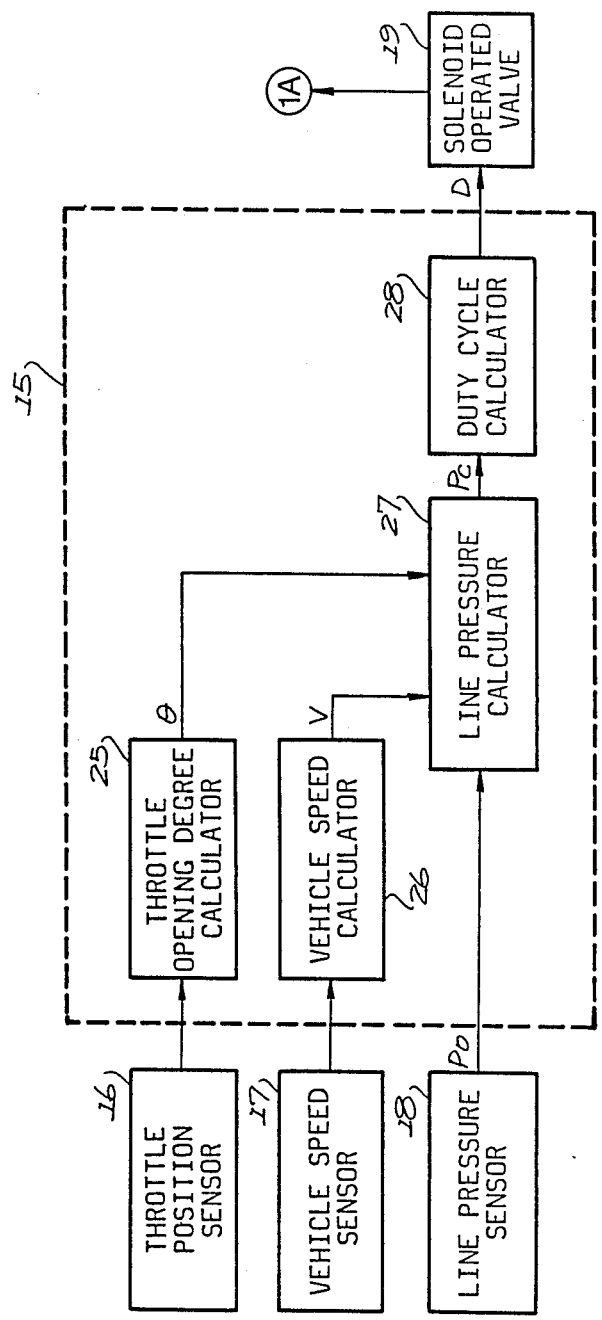

The automatic transmission device 5 is supplied with pressurized oil from a hydraulic control device 14 which is provided under the front drive shaft 8. The hydraulic control device 14 is controlled by a control unit 15 (FIG. 1b). The control system is further provided with a throttle position sensor 16, vehicle speed sensor 17 and line pressure sensor 18 for controlling a solenoid operated valve provided in the hydraulic control device 14.

Figure 2:
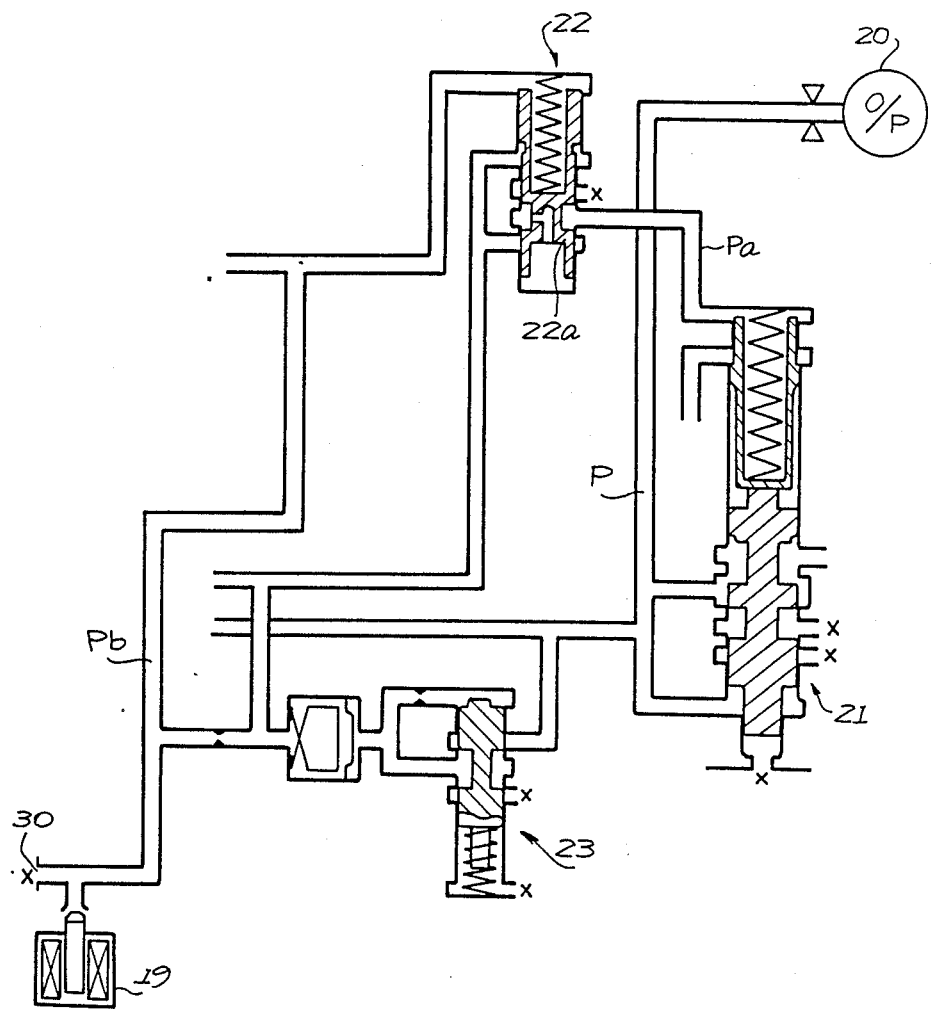
FIG. 2 is a schematic diagram of a hydraulic circuit for controlling line pressure.

Referring to FIG. 2 showing a hydraulic circuit for controlling line pressure, the circuit has a pressure regulator valve 21, a solenoid operated valve 19, a pressure modifier valve 22, and a pilot valve 23. Oil from an oil pump 20 is supplied to pressure regulator valve 21. The pressure regulator valve 21 is supplied with modifier pressure Pa from the pressure modifier valve 22 at the upper end. An upper chamber of the pressure modifier valve 22 is applied with duty pressure Pb which is determined in accordance with the duty cycle of the solenoid operated valve 19. The solenoid operated valve 19 which is operated by pulses from the control unit 15 opens to drain the oil from a drain port 30 when energized. The pressure regulator valve 21 and the pressure modifier valve 22 are communicated with the pilot valve 23. When the duty cycle of the solenoid operated valve 19 increases, amount of drain oil increase, thereby reducing the duty pressure Pb. When duty pressure Pb reduces, a spool 22a rises to reduce the modifier pressure Pa. Accordingly, line pressure P regulated by the regulator valve 21 becomes lower. Thus, the line pressure P is controlled to an optimum value dependent on the driving conditions by controlling the duty cycle of the solenoid operated valve 19.

As shown in FIG. 1b, the control unit 15 for controlling the solenoid operated valve 19 comprises a throttle opening degree calculator 25 and a vehicle speed calculator 26 to which output signals of the throttle position sensor 16 and the vehicle speed sensor 17 are applied, respectively. A throttle opening degree signal $\theta$ calculated by the calculator 25, vehicle speed signal V calculated by the calculator 26 and present line pressure signal Po detected by the line pressure sensor 18 are applied to a line pressure calculator 27 which produces a corrected line pressure signal Pc. The line pressure signal Pc represents necessary line pressure and is fed to a duty cycle calculator 28 where duty cycle D corresponding to the necessary line pressure is calculated. Therefore, the solenoid operated valve 19 is operated at the duty cycle D.

The calculation for obtaining the line pressure P is described hereinafter with reference to FIGS. 3 and 4.

In the present invention the line pressure P is controlled to increase with the increase of the throttle opening degree $\theta$ and to decrease with the increase of the vehicle speed V in a low vehicle speed range. FIG. 3 shows a relationship between the line pressure P and vehicle speed V at wide-open throttle ($\theta = \theta w$), as an example. When the vehicle speed V is lower than a predetermined speed $V_1$, for example a vehicle speed at which the lockup clutch of the torque converter is released, the line pressure decreases linearly in accordance with the following equation.

$$P = f(P_O - CV) \text{ (C is a constant)}$$

When the vehicle speed V reaches the predetermined speed $V_1$ so that the lockup clutch is locked, the line pressure P is kept at a value $P_H$ ($P = P_H$). Accordingly, the characteristic of the line pressure P at wide-open throttle approximates that of engine torque F so that the proportion of the line pressure P to the torque F is substantially constant at any vehicle speed.

FIG. 4 shows relationships between the line pressure P and the throttle opening degree $\theta$ when the vehicle speed as a parameter is lower than vehicle speed $V_1$ ($V \leq V_1$). When the throttle opening degree $\theta$ is smaller than a predetermined degree $\theta_1$ ($\theta \leq \theta_1$), the line pressure P is maintained at a predetermined value $P_1$ as shown by line $1_1$.

When the throttle opening degree $\theta$ is between the predetermined degree $\theta_1$ and another predetermined degree $\theta_2$ which is larger than the predetermined degree $\theta_1$ ($\theta_1 < \theta \leq \theta_2$), the line pressure P is calculated as follows.

$$P = f[(ka\theta + kb) \times (kc - kdV)] \text{ (ka to kd are constants)}$$

Accordingly, the line pressure P increases with increase of the throttle opening degree $\theta$, as shown by lines $1_2$.

When the throttle opening degree $\theta$ exceeds the predetermined degree $\theta_2$ ($\theta > \theta_2$), the line pressure P is calculated as follows.

$$P = f(ke - kgV) \text{ (ke and kg are constants)}$$

Thus, the line pressure P is kept constant as shown by lines $1_3$.

When the vehicle speed V exceeds the predetermined speed $V_1$ ($V > V_1$) while the throttle opening degree $\theta$ is below $\theta_1$, the line pressure P is constant at the pressure $P_1$. When the throttle opening degree $\theta$ is between $\theta_1$ and $\theta_2$, the line pressure P is calculated in accordance with the following equation.

$$P = f[(ka\theta + kb) \times (kc - kdV_1)]$$

Namely, the line pressure P is a function of the throttle opening degree $\theta$. When the throttle opening degree $\theta$ becomes larger than the predetermined value $\theta_2$, the line pressure is kept constant at the value $P_H$ which is obtained by the following equation.

$$P_H = f[(ka\theta_2 + kb) \times (kc - kdV_1)]$$

From the foregoing, it will be understood that the present invention provides a line pressure control system where the proportion of line pressure to torque is maintained substantially constant at any vehicle speed. Accordingly, pump loss of an oil pump provided for the automatic transmission device is decreased.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling line pressure in a hydraulically operated automatic transmission for a motor vehicle having an engine operatively connected to the transmission comprising:

a single engine load detector for producing a load signal dependent on load on the engine of the vehicle;

a vehicle speed detector for producing a vehicle speed signal dependent on speed of the vehicle;

a line pressure calculator responsive to the load signal and vehicle speed signal for producing a line pressure signal representing necessary line pressure;

control signal generating means responsive to the line pressure signal for producing a control signal corresponding to the line pressure signal;

an electromagnetic valve operated by the control signal, for controlling pressure of control oil in a hydraulic circuit of the automatic transmission;

a pressure regulator valve provided in the hydraulic circuit and operated by the control oil to control the line pressure in the transmission;

said line pressure calculator being arranged to produce the line pressure signal representing the necessary line pressure which increases with the load signal and decreases with the vehicle speed signal and has a constant value when the load signal and the vehicle speed signal exceed respective predetermined values, so as to approximate the line pressure to torque of the engine.

2. The system according to claim 1 wherein the engine load detector is a throttle opening degree calculator.

3. The system according to claim 1 wherein the control signal comprises pulses, and the electromagnetic valve is a solenoid operated valve.

4. The system according to claim 1 further comprising a pressure modifier valve operated by the control oil, for generating modifier pressure for operating the pressure regulator valve.

5. A system according to claim 1, further comprising an oil pump provided in the hydraulic circuit, and
said line pressure calculator produces said line pressure signal such that the proportion of the necessary line pressure to engine torque is substantially constant, so as to prevent pump loss in said oil pump in the hydraulic circuit and shock from occurring at starting of increasing of the transmission ratio of the transmission at any vehicle speed.

6. A system according to claim 1, wherein
said line pressure calculator is further responsive to line pressure in the hydraulic circuit of the automatic transmission.

7. A system according to claim 1, wherein
said transmission includes a lockup clutch of a torque converter, and
one of said predetermined values represents a vehicle speed at which said lockup clutch of said torque converter is released, and wherein said line pressure calculator decreases said line pressure signal representing the necessary line pressure linearly with increasing vehicle speed below said one predetermined value.

* * * * *